United States Patent [19]

Sheu

[11] Patent Number: 5,740,937
[45] Date of Patent: Apr. 21, 1998

[54] COMBINATION PAN

[76] Inventor: Frank Sheu, P.O. Box 82-144, Taipei, Taiwan

[21] Appl. No.: 844,651

[22] Filed: Apr. 21, 1997

[51] Int. Cl.$^6$ .................................................. B65D 25/00
[52] U.S. Cl. ........................................ 220/23.83; 220/912
[58] Field of Search ............................... 220/912, 571, 220/572, 577, 23.83, 23.86

[56] References Cited

U.S. PATENT DOCUMENTS

| | | | |
|---|---|---|---|
| 769,119 | 8/1904 | Strickland | 220/912 X |
| 1,103,169 | 7/1914 | Beam | 220/572 X |
| 2,123,359 | 7/1938 | Hallmark | 220/912 X |
| 2,575,843 | 11/1951 | Semrow | 220/572 X |
| 4,574,776 | 3/1986 | Hidle | 220/23.83 X |
| 5,139,166 | 8/1992 | Smith | 220/23.83 X |
| 5,202,098 | 4/1993 | Nichols | 220/23.83 X |
| 5,402,714 | 4/1995 | Deneault et al. | 220/912 X |

*Primary Examiner*—Steven M. Pollard
*Attorney, Agent, or Firm*—A & J

[57] ABSTRACT

A combination pan includes a steamer pan having longitudinal and transverse grooves intersected at its bottom side and through holes aligned in the longitudinal and transverse grooves, and a frying pan detachably covered over the bottom side of the steamer pan and having longitudinally and transversely aligned flat blocks raised from the top side of its bottom wall and separated from one another by longitudinal and transverse grooves and a plurality of annular ribs concentrically raised from the bottom side of its bottom wall in the middle.

3 Claims, 8 Drawing Sheets

COMBINATION PAN

BACKGROUND OF THE INVENTION

1. Field of the Invention

This invention relates to kitchen utensils, and more particularly to a combination pan which is comprised of a frying pan and a steamer pan detachably attached together.

2. Description of the Prior Art

When cooking foods, different kitchen utensils may be used. For example, a frying pan shall be used when to fry foods; a steamer shell be used when to steam foods. When frying foods in a frying pan, foods may be burned if the cooking time is not properly controlled. In order to prevent burning of foods, a small amount of water may be sprayed over foods when frying. Further, when frozen foods are taken out of the freezing chamber, they must be unfrozen before cooking, and a suitable apparatus shall be used to unfreeze frozen foods.

SUMMARY OF THE INVENTION

This invention relates to kitchen utensils, and more particularly to a combination pan which is comprised of a frying pan and a steamer pan detachably attached together.

According to one aspect of the present invention, the combination pan comprises a steamer pan and a frying pan detachably attached together. The steamer pan has longitudinal and transverse grooves intersected at its bottom side and through holes aligned in the longitudinal and transverse grooves. When foods are put on the steamer pan of the combination pan for frying, a small amount of water can be poured into the frying pan so that steam is produced to wet frying foods and to prohibit frying foods from burning. According to another aspect of the present invention, the frying pan is made from aluminum alloy, having longitudinally and transversely aligned flat blocks raised from the top side of its bottom wall and separated from one another by longitudinal and transverse grooves. When the frying pan is detached from the steamer pan, it can be used independently for frying foods or unfreezing frozen foods. According to still another aspect of the present invention, the frying pan has a plurality of annular ribs concentrically raised from the bottom side of its bottom wall in the middle. When the frying pan is put on the gas range or a stove and heated, the head of the fire can be concentrated by the annular ribs to heat foods efficiently.

BRIEF DESCRIPTION OF THE DRAWINGS

The invention is further described hereafter, by way of example only, with reference to the accompanying drawings, in which.

2

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
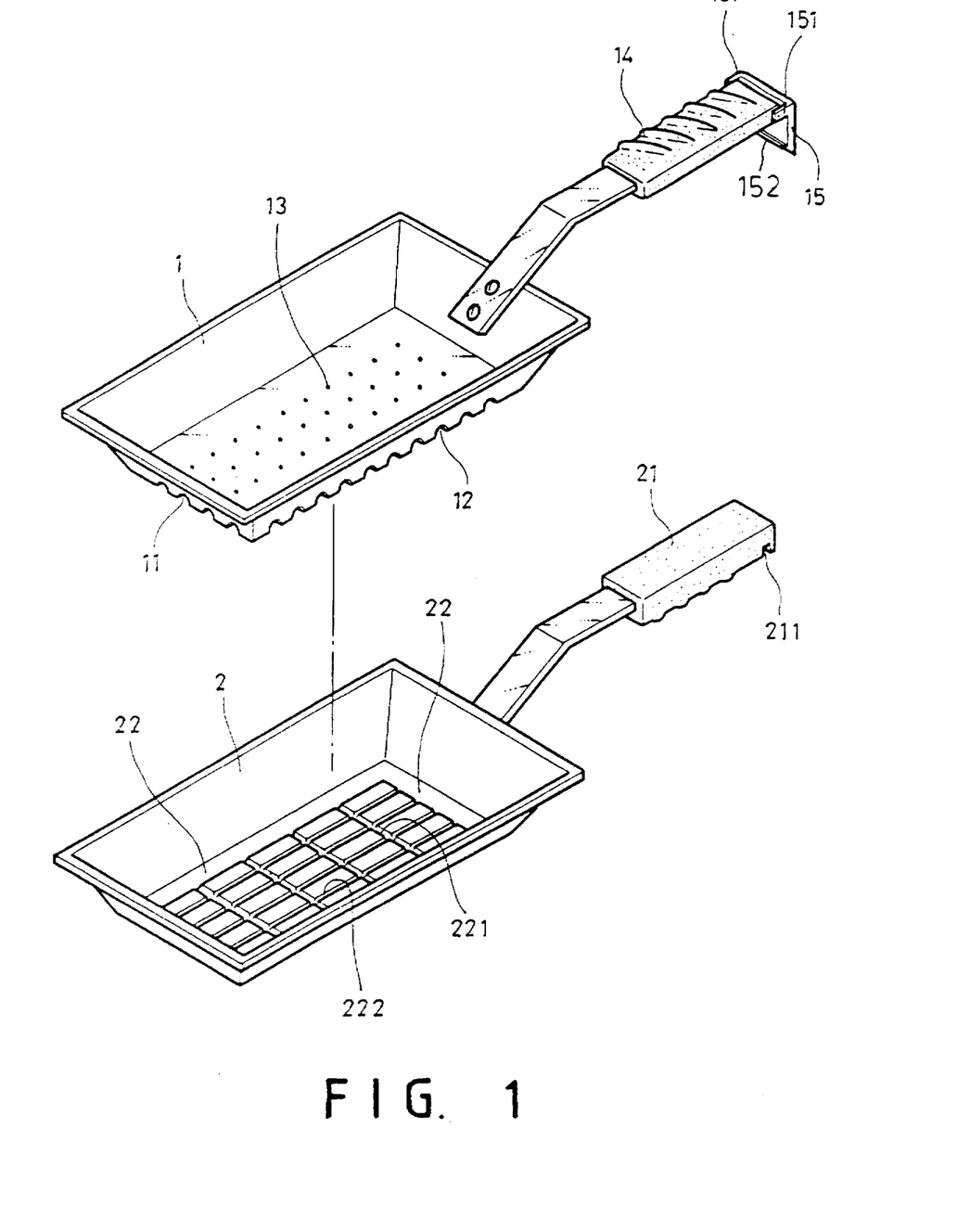
FIG. 1 is an exploded view of a combination pan according to the present invention.

Referring to FIG. 1, a combination pan in accordance with the present invention is comprised of a steamer pan 1 and a frying pan 2 attached together. The steamer pan 1 and the frying pan 2 are preferably made from aluminum alloy. The steamer pan 1 is equipped with a handle 14, having longitudinal grooves 11 and transverse grooves 12 intersected at its bottom side and a plurality of through holes 13 through its bottom side. A loop-like retainer 15 is provided having two lugs 151 and a locating rib 152. The lugs 151 of the loop-like retainer 15 are bilaterally pivoted to the end of the handle 14. The frying pan 2 fits over the bottom side of the steamer pan 1, and is equipped with a handle 21 which has a transverse locating groove 211 adapted to be engaged with the locating rib 152 of the loop-like retainer 15. A plurality of longitudinally and transversely aligned flat blocks 221 are raised from the top side of the bottom wall 22 of the frying pan 2 and separated from one another by longitudinal and transverse grooves 222.

Figure 2:
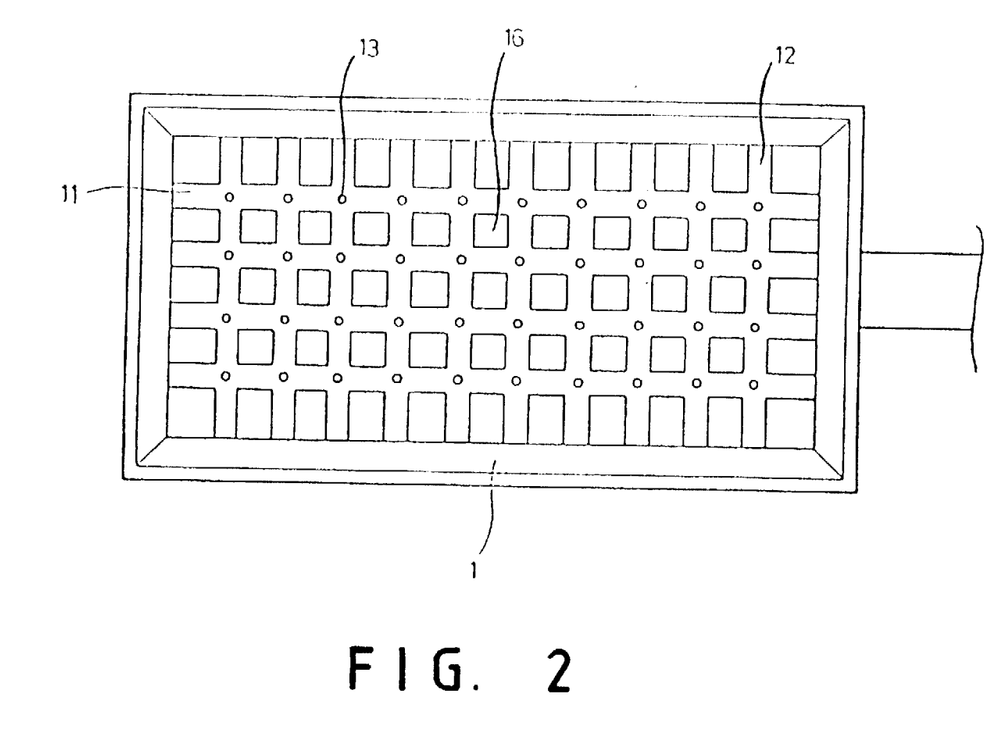
FIG. 2 is a plain bottom view in an enlarged scale of the steamer pan according to the present invention.

Referring to FIG. 2, the bottom side of the steamer pan 1 is divided by the longitudinal grooves 11 and the transverse grooves 12 into a plurality of flat blocks 16 that are disposed in flush, and the through holes 13 are aligned in the grooves 11, 12.

Figures 3, 3A:
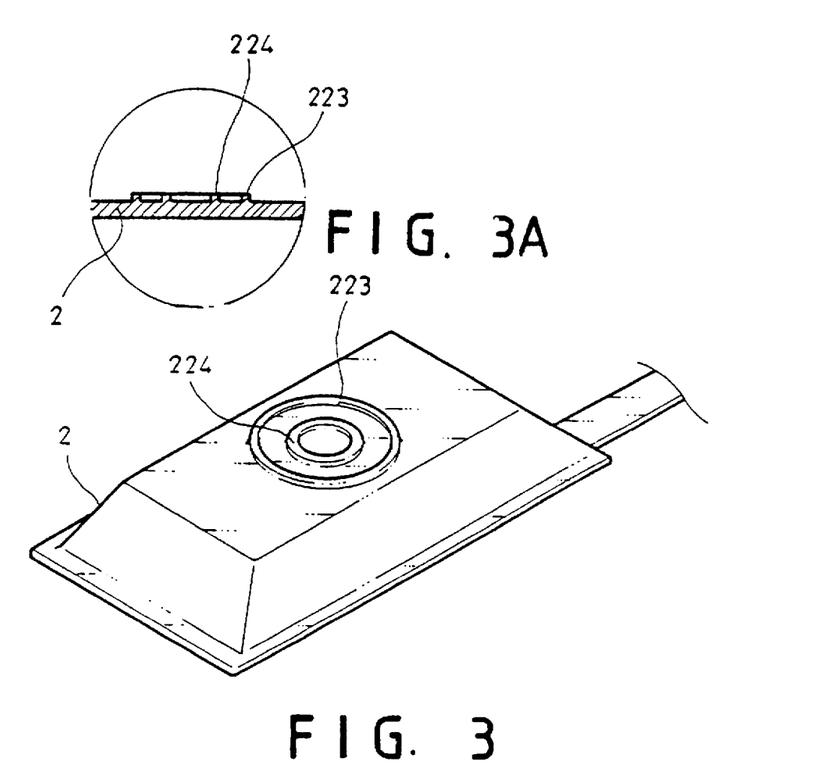
FIG. 3 shows the bottom structure of the frying pan according to the present invention.
FIG. 3A is a cross sectional view of a part of FIG. 3, showing annular ribs raised from the bottom side of the bottom wall of the frying pan.

Referring to FIGS. 3 and 3A, a plurality for example two annular ribs 223, 224 are concentrically raised from the bottom side of the frying pan 2.

Figure 4:
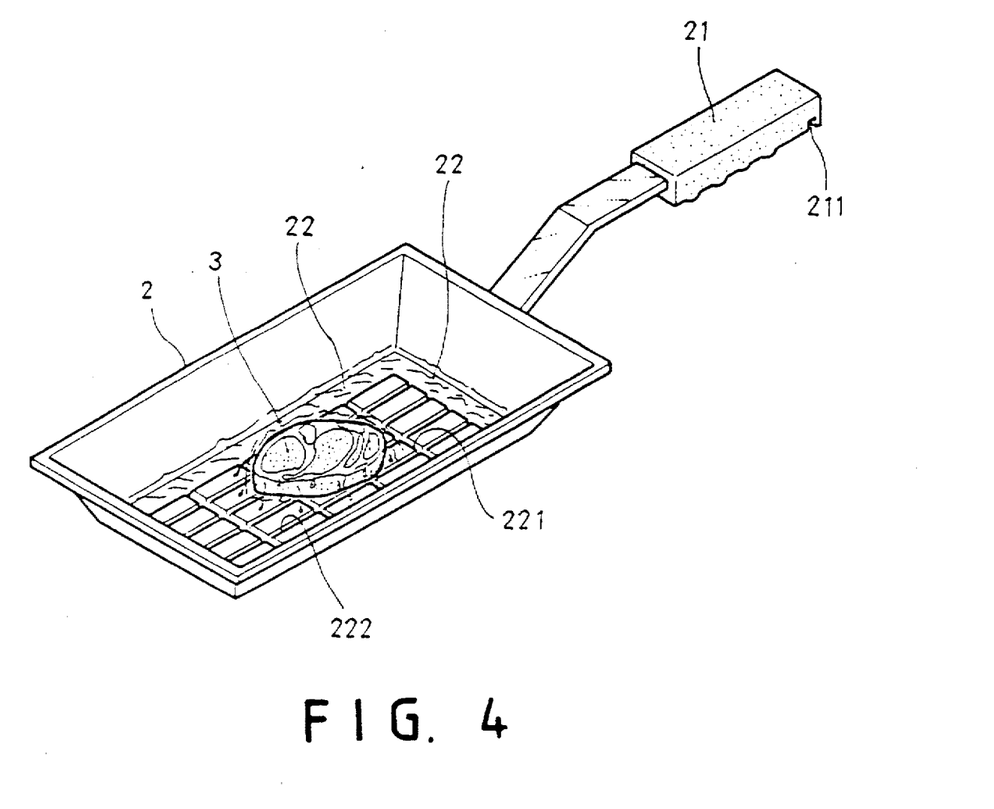
FIG. 4 is an applied view of the frying pan according to the present invention.

Referring to FIG. 4, when the frying pan 2 is detached from the steamer pan 1, it can be used independently for frying foods or unfreezing frozen foods. When frozen foods are unfrozen, water is guided from unfrozen foods by the grooves 222 to the lowest border area.

Figure 5:
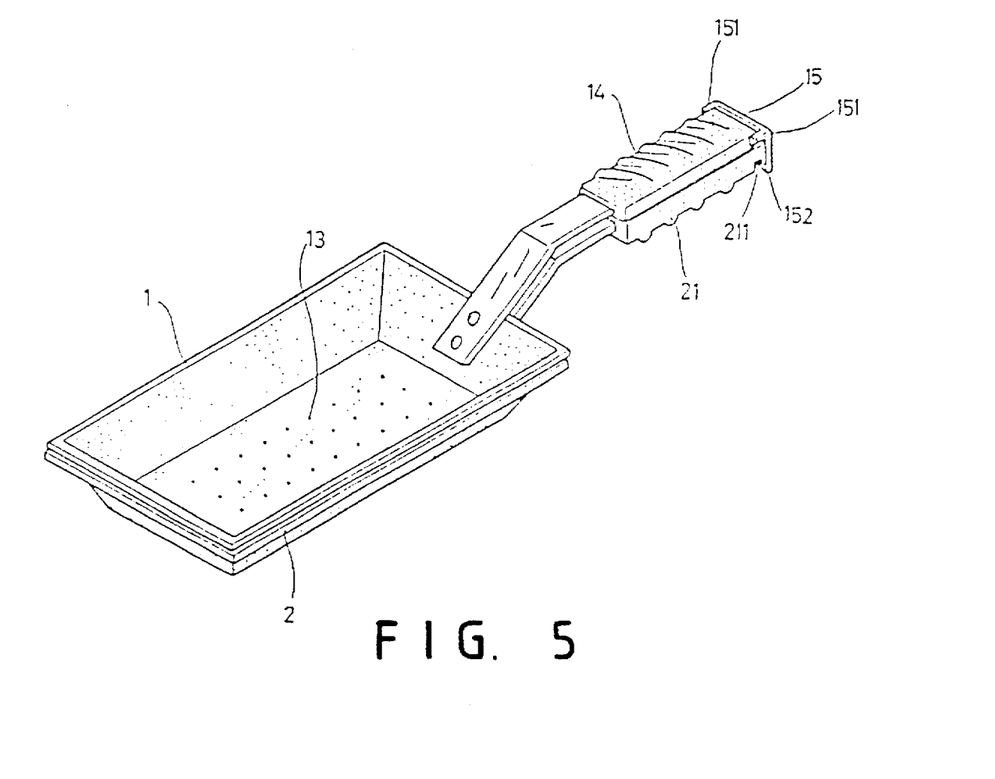
FIG. 5 is an elevational view of the present invention, showing the steamer pan and the frying pan fastened together.
Figure 6:
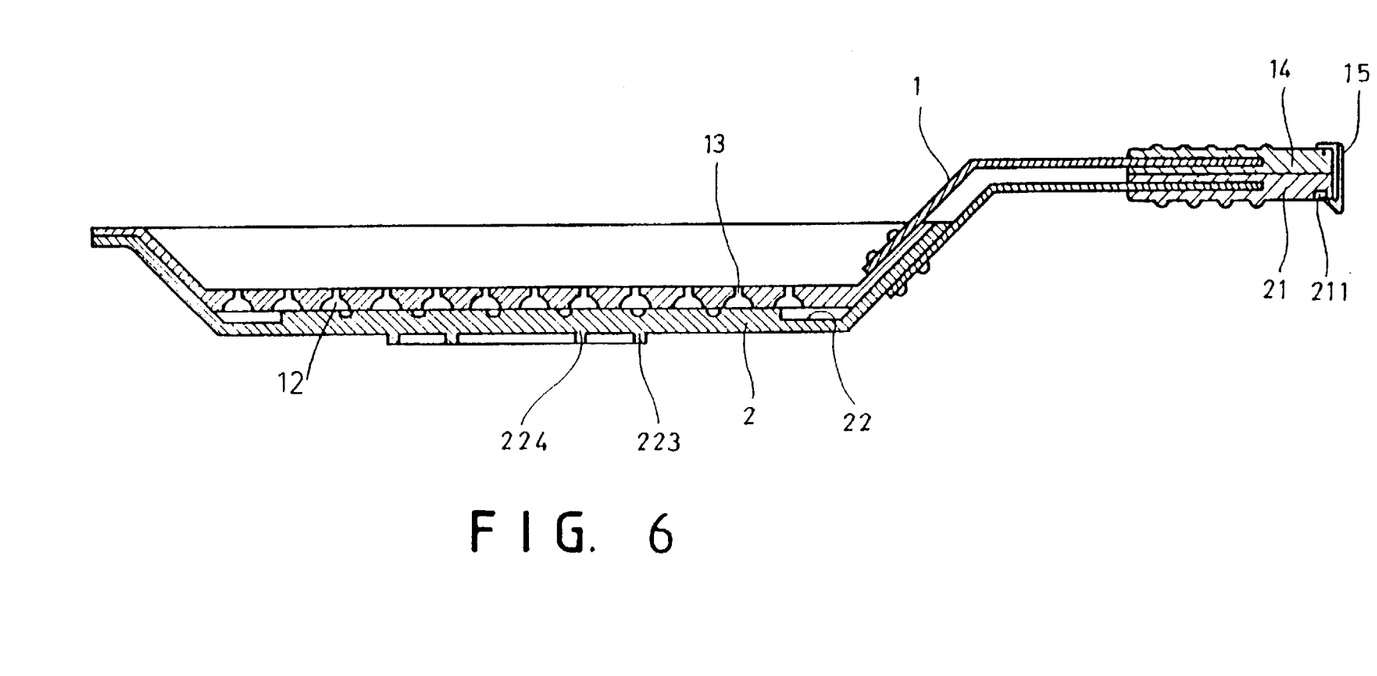
FIG. 6 is a sectional view in an enlarged scale of the present invention, showing the steamer pan and the frying pan fastened together.

Referring to FIGS. 5 and 6 and FIG. 1 again, when the steamer pan 1 and the frying pan 2 are attached together, the loop-like retainer 15 of the handle 14 of the steamer pan 1 is fastened to the handle 21 of the frying pan 2 by forcing locating rib 152 of the loop-like retainer 15 into engagement with the locating groove 211 of the handle 21 of the frying pan 2. When connected, the flat blocks 16 of the steamer pan 1 are closely attached to the flat blocks 221 of the frying pan 2. Therefore, heat can be quickly transmitted from the frying pan 2 to the steamer pan 1 to cook foods. Further, the through holes 13 preferably have a diameter gradually reducing toward the top and the grooves 11, 12 preferably have a smoothly arched cross section, so that steam can be quickly guided from the frying pan 2 to the foods carried on the steamer pan 1.

Figure 7:
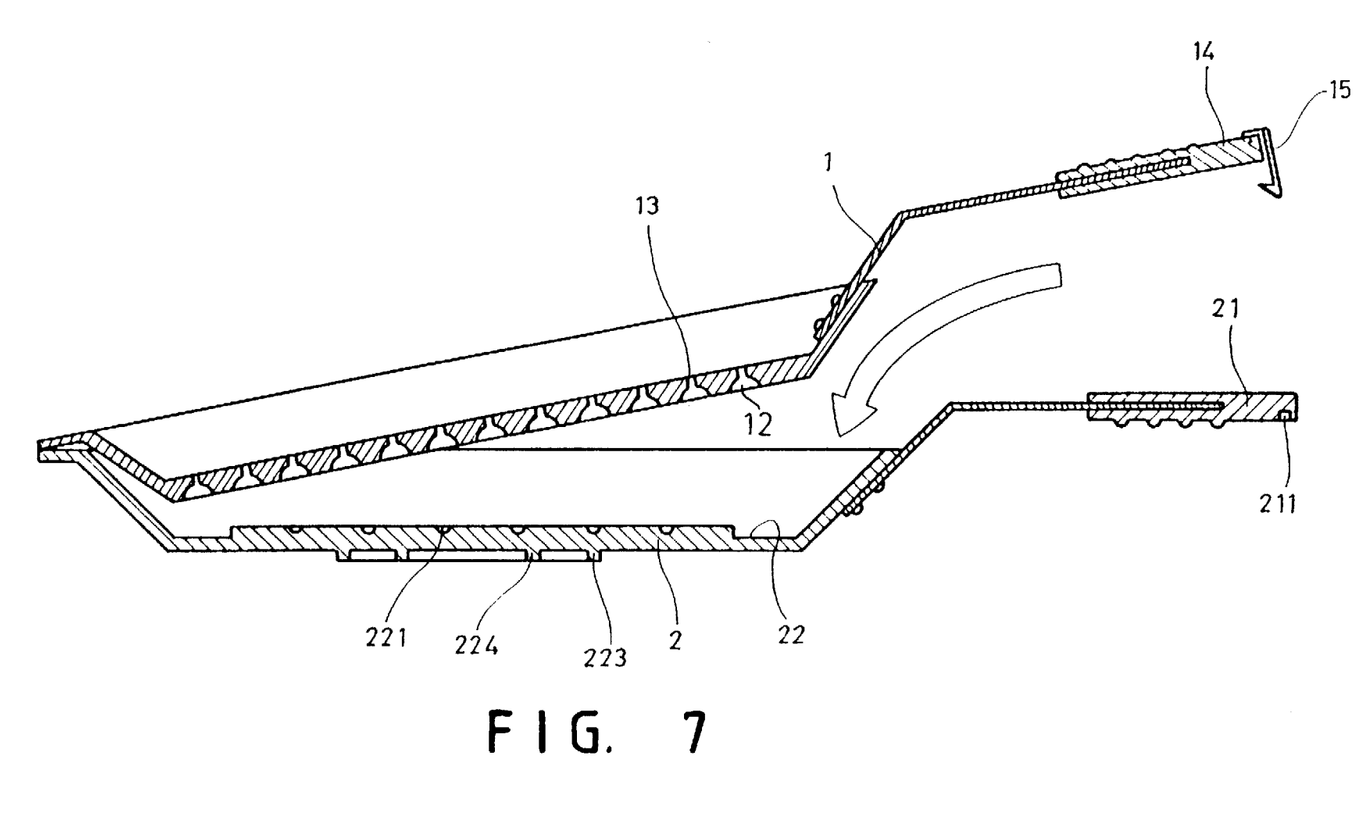
FIG. 7 is another sectional view of the present invention, showing the steamer pan opened from the frying pan.
Figure 8:
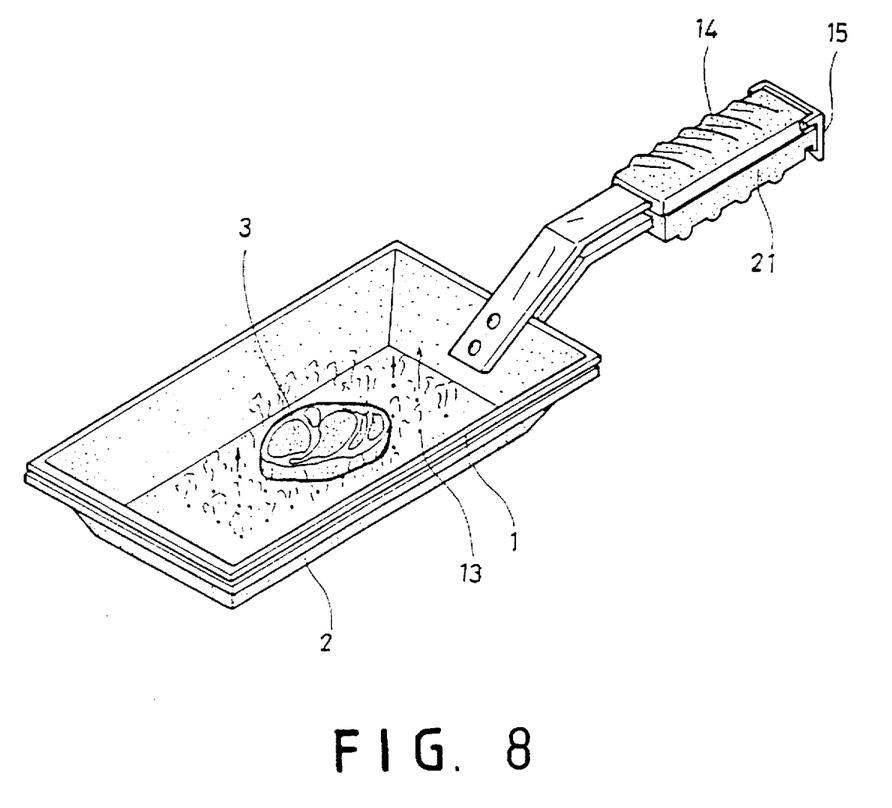
FIG. 8 is an applied view of the combination pan according to the present invention.

Referring to FIGS. 7 and 8, when using the combination pan to fry meat 3, a certain amount of water can be poured into the frying pan 2 and heated into steam. Therefore steam passes through the through holes 13 to moisten meat 3 when it is fried on the steamer pan 1.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A combination pan comprising:

a steamer pan, having a bottom wall, longitudinal grooves and transverse grooves intersecting at a bottom side of its bottom wall, a plurality of through holes through its bottom side and respectively aligned in said longitudinal grooves and said transverse grooves;

a frying pan fitting over the outside wall of said steamer pan, said frying pan comprising a bottom wall having a top side and a bottom side, a plurality of longitudinally and transversely aligned flat blocks raised from the top side of its bottom wall and separated from one another by longitudinal and transverse grooves, and a plurality of annular ribs concentrically raised from the bottom side of its bottom wall in the middle.

2. The combination pan as claimed in claim 1, wherein said steamer pan and said frying pan are respectively equipped with a handle adapted to be closely attached to each other.

3. The combination pan as claimed in claim 2, wherein the handle of said frying pan has a locating groove; the handle of said steamer pan is provided with a loop-like retainer adapted for securing the handle of said frying pan and the handle of said steamer pan together, said loop-like retainer comprising two lugs bilaterally pivoted to the handle of said steamer pan, and a locating rib adapted to be forced into engagement with the locating groove of said frying pan.

* * * * *